United States Patent [19]

Chan

[11] Patent Number: 5,446,873
[45] Date of Patent: Aug. 29, 1995

[54] MEMORY CHECKER

[75] Inventor: James Chan, Taipei,

[73] Assignee: Brain Power Co., Taipei, Taiwan

[21] Appl. No.: 136,127

[22] Filed: Oct. 15, 1993

[51] Int. Cl.[6] .............................................. G06F 11/34
[52] U.S. Cl. ................................... 395/180; 371/49.2; 371/48
[58] Field of Search ............. 395/575; 371/10.1, 40.1, 371/49.1, 49.2, 49.3, 21.1, 48, 50.1, 51.1, 37.6, 15.1, 29.5; 365/200, 201; 360/26, 36, 38, 47, 53

[56] References Cited

U.S. PATENT DOCUMENTS

| | | | |
|---|---|---|---|
| 4,360,915 | 11/1982 | Sindelar | 371/13 |
| 4,472,805 | 9/1984 | Wacyk et al. | 371/51 |
| 4,926,426 | 5/1990 | Scheuneman et al. | 371/40.1 |
| 5,255,230 | 10/1993 | Chan et al. | 365/201 |

*Primary Examiner*—Robert W. Beausoliel, Jr.
*Assistant Examiner*—Phung My Chung
*Attorney, Agent, or Firm*—Jacobson, Price, Holman & Stern

[57] ABSTRACT

A new memory checker comprised of a parity checker (51), a bit storage (52), and a parity generator (53), and installed in the memory module (20) of a computer system (10) for checking data error, wherein the parity checker (51) receives the data bus and input parity signal from the computer system (10) to check out error from the data been fetched from the memory module (20) and then to provide an interrupt signal (43) to the computer system (10) upon the checking of an error.

1 Claim, 4 Drawing Sheets

MEMORY CHECKER

BACKGROUND OF THE INVENTION

The present invention relates to a new memory checker for checking reading and writing data in a memory module, and more particularly to such a memory checker which occupies less memory bits to effectively check reading and writing data in a memory module. Conventionally, a big memory space must be reserved in the memory module for storing checking bits corresponding to the respective data byte address. The memory checker of the invention greatly improves the demand for memory capacity, and it immediately sends any detected error information to the system, as the system is reading the data, so that the system knows quickly whenever there is wrong data stored in the memory module.

DESCRIPTION OF THE PRIOR ART

In a normal computer system, as shown in FIG. 1, a parity generator 30 and a parity checker 40 are commonly disposed between the system 10 and the memory module 20 to check the correction of data written by the system 10 in the memory module. As the system 10 stores an input data bus 31 in the memory module 20 according to even parity or odd parity checking protocol, the parity generator 30 generates an input parity bit 32 according to the result of the checking of the input data bus 31. The parity bit 32 and the the input data bus 31 are then respectively stored in the data byte memory 21 and check bit memory 22 of the memory module 20 according to the read/write control signal 12 and assigned address of the address bus 11 and respectively stored (see also FIG. 2).

As shown in FIG. 2, In addition to the data byte memory 21, the data memory module 20 has a check bit memory 22 for storing the input parity 32 of the parity generator 30. As every input data bus 31 is accompanied with an input parity bit 32, the memory module 20, either for storing 8-bit, 16-bit, or 32-bit data bytes, must be formed of at least nine or seventeen or thirty three memories having the same address space. Therefore, a so-called 16 mega byte memory module comprises a 16 mega byte memory and a 16 mega bit memory, and the 16 mega bit memory is completely provided for storing parity signals 32. Obviously, a module having a bigger capacity needs a bigger check bit memory 22 for storing parity value 32.

Further, in regular computer systems, as the system 10 fetches data from the memory module 20, the data byte memory 21 and check bit memory 22 of the memory module 20 are read out data according to the instruction and control of the address bus 11 and read/write control signal 12 of the system 10. While reading, the data in the data byte memory 21 and the parity value in the check bit memory 22 are simultaneously sent to the parity checker 40 for checking every set of data read from the output data bus 41 and the out put parity bit 42 of the same address if the relation therebetween is in conformity with the checking protocol. When an error is checked, the parity checker 40 provides an interrupt signal to the system 10, informing it of the error.

Therefore, the aforesaid conventional memory checking method to check the data stored in the data byte memory 21 of the memory module executes the checking procedure through the parity checker 40 to find the error and inform the system of the error by providing it with an interrupt signal only when the data on the same address is read again. Therefore, the memory module itself does not have any capability to check any error and to inform any error to the system immediately. On the contrary, the system knows the presence of an error only when the data on the same address is fetched again. In general, this type of conventional memory module 20 is of low efficiency in responding to data error.

SUMMARY OF THE INVENTION

The present invention has been accomplished under the aforesaid circumstances. It is therefore an object of the present invention to provide a memory checker for the memory module of a computer system for checking data error which needs less memory space of the memory module to effectively execute data checking so that the memory capacity is greatly saved, and the memory installation cost is greatly reduced.

It is another object of the present invention to provide a memory checker for the memory module of a computer system for checking data error which efficiently checks out all possible errors made during the writing of every address data in the memory module by the computer system, each time the computer system fetches data from the memory module.

According to the preferred embodiment of the present invention, the memory checker is installed in the memory module of a computer system to check possible error from the data stored in the memory module, and comprised of a parity checker, a bit storage, and a parity generator. The parity checker receives the data bus and input parity signal from the computer system to check out error from the data been fetched from the memory module, and is controlled by the read/write control signal of the computer system to provide a corresponding bit value output to the bit storage as it checks out the relation between the data bus and the input parity bit being not in conformity with the terms of parity checking protocol, and then to provide an interrupt signal to the computer system upon the checking of such an error.

DETAILED DESCRIPTION OF THE PREFERRED EMBODIMENT

A memory checker in accordance with the present invention is explained hereinafter through the operation of a computer system which executes read/write process according to even parity checking protocol.

Figure 1:
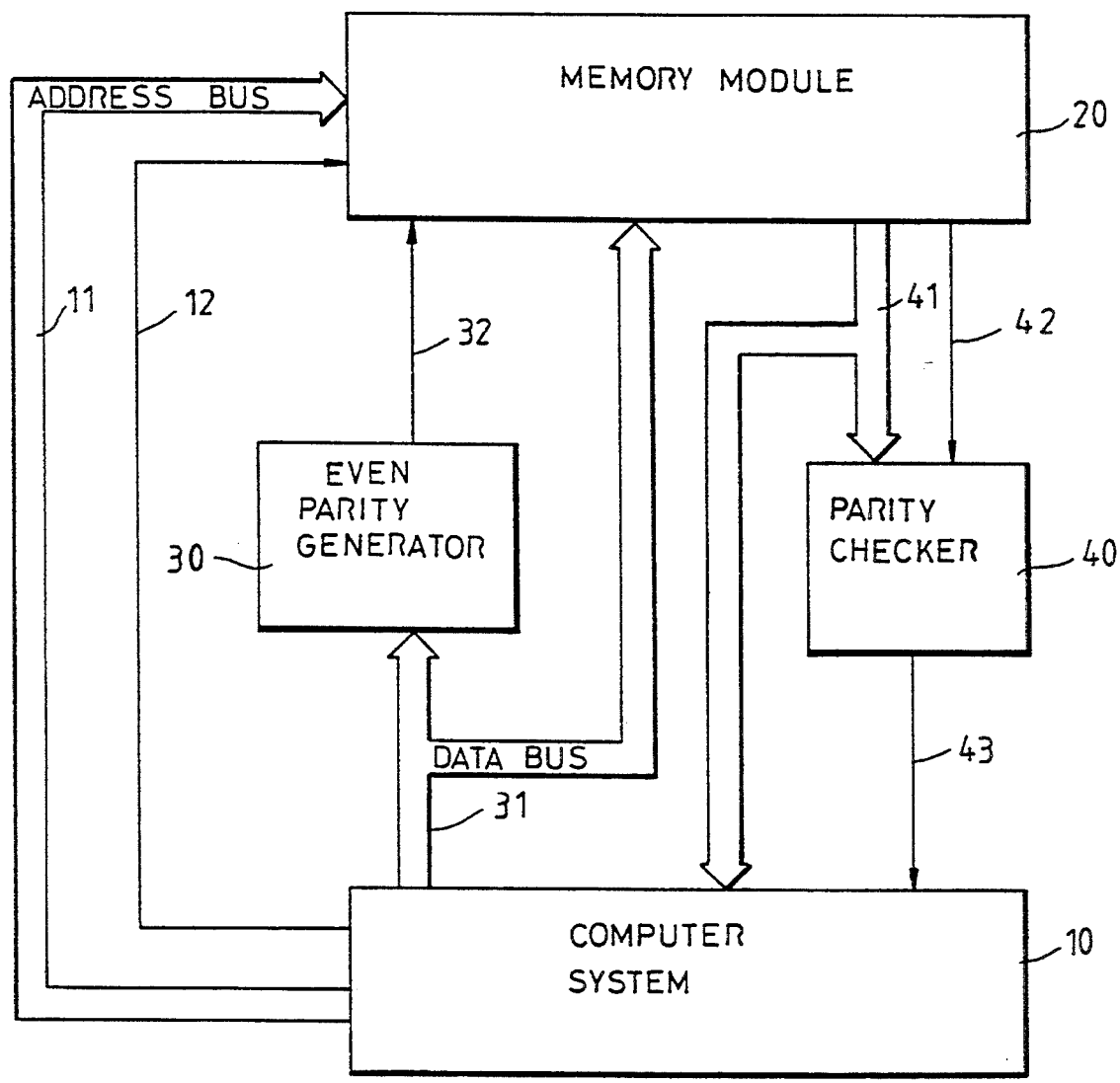
FIG. 1 is a diagram showing the relative operations between a computer system and the memory module thereof according to the prior art.
Figure 2:
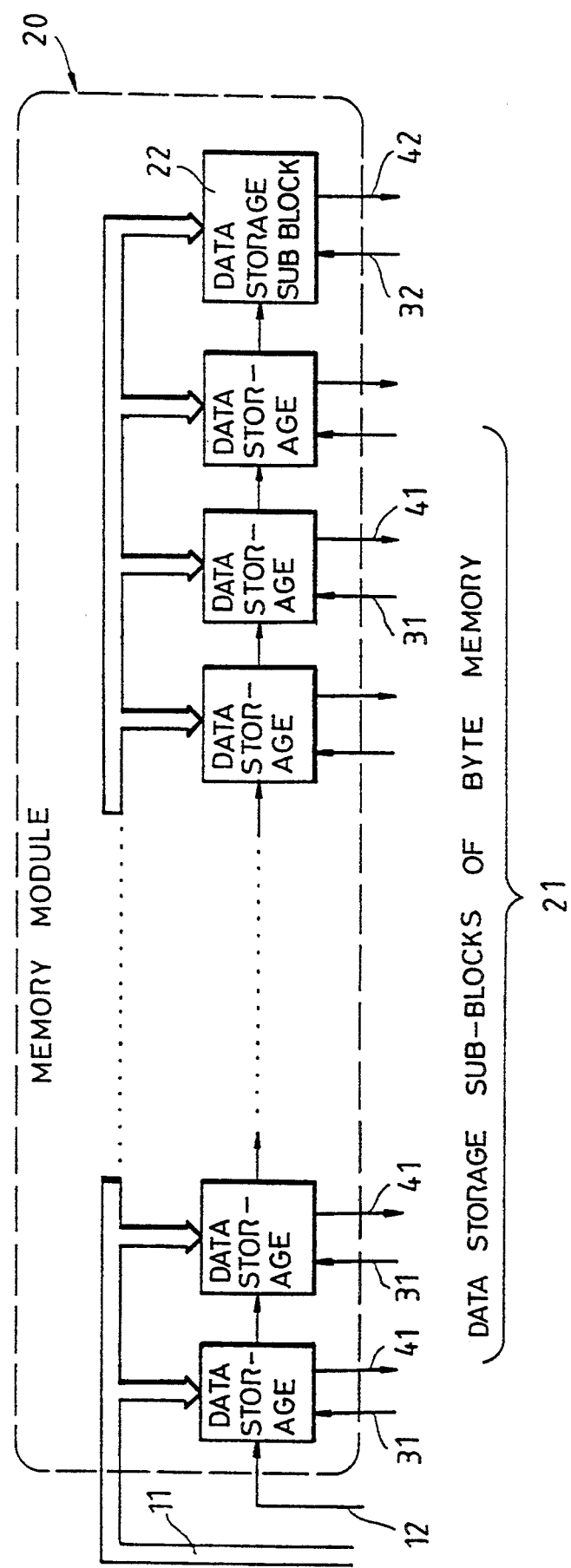
FIG. 2 shows the circuit layout of a memory module according to the prior art.

Referring to FIG. 1, in regular computer systems adopting even parity checking protocol, the system 10 directly and simultaneously inputs a data bus 31 into the memory module 20 and the even parity generator 30 while data is writing in the memory module 20 through the system 10. Upon receipt of the data from the system 10, the even parity generator 30 generates an input even parity 32 according to the input data bus 31 and the terms of even parity checking protocol, and then sends it to the memory module 20. At the same time, the system 10 inputs an address bus 11 and a read/write control signal 12 to the memory module 20 for controlling the writing of the data at a specific address in the memory module 20.

Figure 3:
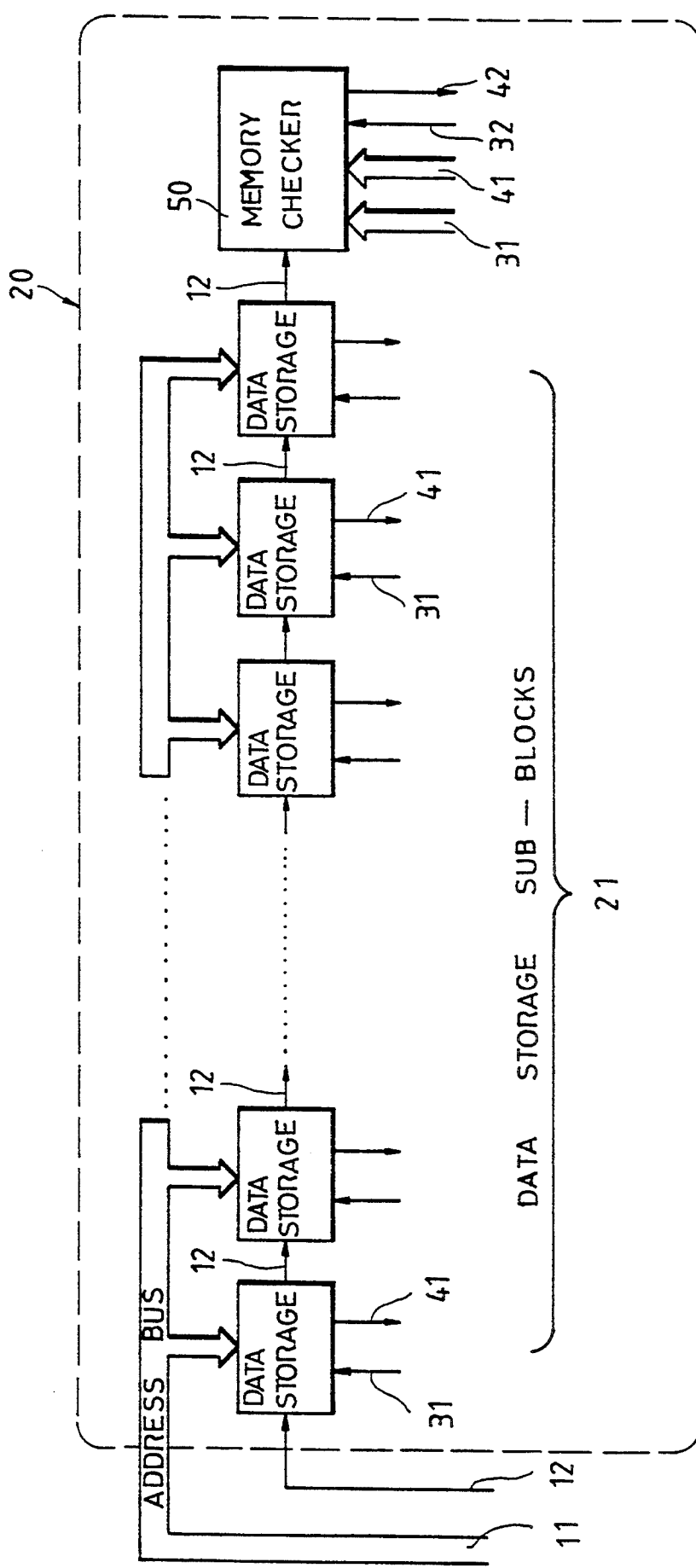
FIG. 3 shows the circuit layout of a memory module according to the present invention.

Referring to FIG. 3, therein illustrated is a memory module 20 made according to the present invention. The memory module 20 is comprised of a data byte memory 21 and a memory checker 50. The data byte memory 21 is for storing data so that the computer system can write data in the data byte memory 21 and read the data therefrom. The capacity of the data byte memory 21 is determined according to the bit number and capacity of the memory module used in the computer system. The data byte memory 21 receives the data bus 31 address bus 11, and read/write control signal 12. The data of the data bus 31 is written in or read out from the memory 21 according to the address assigned by the system. At the same time, the memory checker 50 receives the data 31 written in the memory 21 by the system 10 or the data 41 read out from the memory 21 by the system 10, and the even parity bit 32 generated by the even parity generator 30 and the read/write control signal 12 provided by the system 10, and then processes the data received so as to produce an output even parity bit 42.

Figure 4:
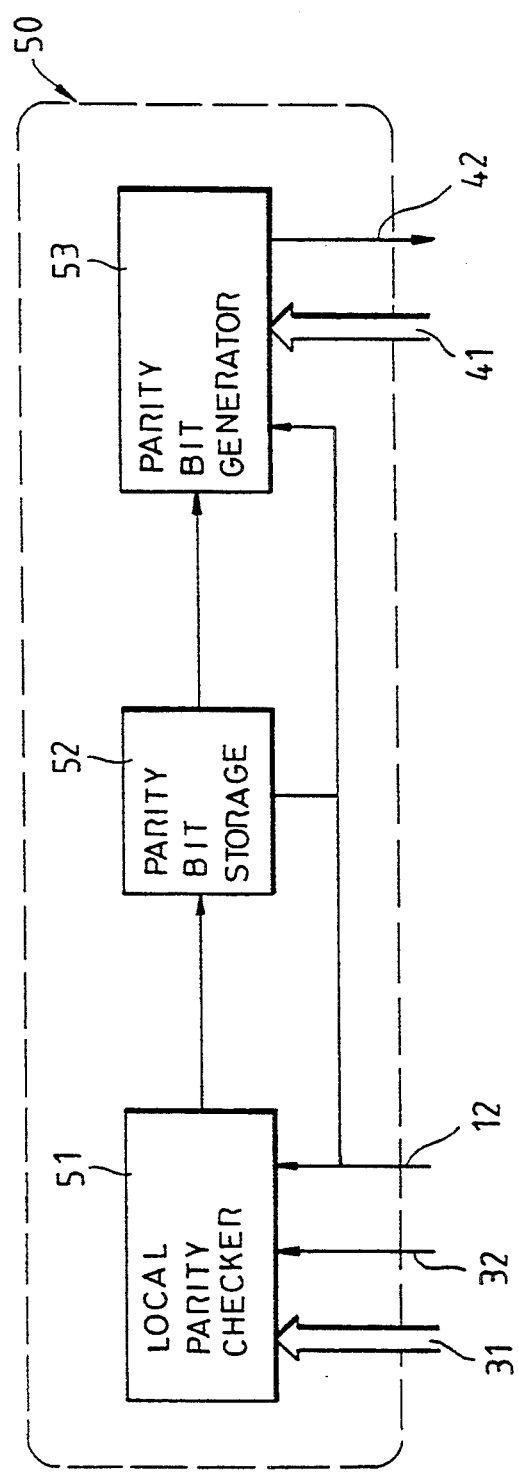
FIG. 4 shows the circuit layout of a memory checker according to the present invention.

Referring to FIG. 4, the memory checker 50 is comprised of an even parity checker 51, a bit storage 52, and a parity generator 53. As the system writes data in the memory checker 50, the even parity checker 51 receives the data bus 31 from the system 10 and the input even parity bit 32 generated by the even parity generator 30, and is controlled by the read/write control signal 12 of the system 10 to check the relation between the data bus 31 and the input even parity bit 32 according to the terms of even parity checking protocol. If the data 31 and the value of the input even parity bit 32 are checked not in conformity with the even parity checking protocol, the even parity checker 51 immediately sends a bit value corresponding to such a data error to the bit storage 52. The bit storage 52 simultaneously receives the read/write control signal 12 of the system 10 for controlling the write-in of such a bit value. As the system 10 reads out data from the memory module 20, the bit storage 52 is controlled by the read/write control signal 12 of the system 10 to output the stored bit value to the parity generator 53 and simultaneously to clear the stored bit value from its storage space. The parity generator 53 simultaneously receives the data 41 from the memory 21 of the memory module 20 and the read/write control signal 12 of the system 10, and is controlled to output a bit signal 42 according to the checking protocol. If the bit value in the bit storage 52 represents a data error, the parity generator 53 will produce a bit signal 42 not in conformity with the checking protocol, and the bit signal 42 will be sent with the output data bus 41 of the memory module 20 to the even parity checker 40 of the system, and therefore the even parity checker 40 checks the error signal of the parity generator 53 of the memory checker 50 and then sends an interrupt signal 43 to the system 10, informing of the presence of such an error in the fetched data at a certain address.

As the memory checker uses only one bit memory space when it is installed in a memory module for checking input data, the memory space of the byte memory of the memory module can be fully utilized for storing data. Further, as the system fetches data from the memory module, the memory checker immediately informs the system if there is any error of data in the byte memory at a certain address, if any. Therefore, the memory checker greatly improves the data processing efficiency and capability of the memory of the system.

While only one embodiment of the present invention has been shown and described, it will be understood that various modifications and changes could be made without departing from the spirit and scope of the invention. For example: the parity generator of the memory checker may be made to fit odd parity checking protocol so that the memory checker can be used in a computer system adopting odd parity checking protocol.

What is claimed is:

1. A memory checker comprising: a parity checker, a bit storage connected to said parity checker, and a parity generator connected to said bit storage, and installed in a memory module of a computer system for checking data error, wherein:

the parity checker receives a data bus from the computer system and an input parity bit generated by a parity generator of the computer system, and is controlled by a read/write control signal from the computer system to provide a corresponding bit value output to the bit storage as the parity checker determines whether a relation between the data bus and the input parity bit is in conformity with a parity checking protocol;

the bit storage receives the bit value output of the parity checker and the read/write control signal from the computer system, and is controlled by the read/write control signal to output the stored bit value to the parity generator and simultaneously to clear the stored bit value from the bit storage;

the parity generator receives an output data bus of the memory module and the read/write control signal of the computer system, and is controlled to output a bit signal to the parity checker according to the parity checking protocol, causing the parity checker to determine whether there is an error in data which has been fetched from the memory module and then to provide an interrupt signal to the computer system upon determining that an error exists.

* * * * *